United States Patent Office 2,964,537
Patented Dec. 13, 1960

2,964,537

THERAPEUTICALLY VALUABLE CARBOXYLIC ACID ESTERS OF 17-ALKYL-19-NOR-TESTOSTERONE

Otto Engelfried, Berlin-Wittenau, Emanuel Kaspar, Berlin-Wilmersdorf, and Martin Schenck and Alfred Popper, Berlin-Frohnau, Germany, assignors to Schering A.G., Berlin, Germany, a corporation of Germany No Drawing. Filed June 11, 1957, Ser. No. 664,895

Claims priority, application Germany June 16, 1956

8 Claims. (Cl. 260—397.4)

This invention relates to a method of preparing therapeutically valuable carboxylic acid esters of 17-alkyl-19-nor-testosterone and to products obtained thereby, the term "alkyl" including alkenyl and alkinyl.

Known carboxylic acid esters of 19-nor-testosterone possess a powerful anabolic action aside from their androgen effect. 17-alkyl-19-nor-testosterones having a free OH-group in the 17-position of U.S. Patent No. 2,721,871 exhibit valuable therapeutic properties. Saturated alkyl compounds of this type are noted for their anabolic action, while the 17-ethinyl-19-nor-testosterone shows substantial progestative properties, superior to those of 17-ethinyl-testosterone.

Now we have found that the hitherto unknown carboxylic acid esters of 17-alkyl-19-nor-testosterone represent valuable therapeutica, particularly because of their excellent progestative properties which manifest themselves upon either oral or subcutaneous application. Inasmuch as these esters are readily soluble in the usual solvents for steroid hormones, namely in vegetable oils such as sesame-, castor-, cottonseed-, sunflower-, olive- and other oils, as well as in synthetic solvents such as glycols, lactic acid esters and the like, it is possible to inject such solution of these esters and thus deposit the hormone for protracted effects.

The results of pharmacological research relating to the progestative effect with subcutane and perorale application of the new compounds are set forth in the following schedule. The Clauberg test (Natural Products Related to Phenanthrene, by Fieser and Fieser, Reinhold Publishing Corp., New York, page 382), appeared positively in application of the amount of steroid-compound mentioned below. The research work was carried out using infantile rabbits.

The increased duration of the progestative activity of the compounds of the present invention may be observed in the following table. Infantile rabbits which were pretreated with oestradiol were each given single injections of solutions of the substances listed in the table, each injection solution containing 10 mg. of the substance in sesame oil. The duration of the activity is compared in the following table to progesterone.

Substance: Duration, days
Progesterone _____ 7
17α-ethinyl-19-nor-testosterone-acetate _____ 10
17α-ethinyl-19-nor-testosterone-valerate _____ 11
17α-ethinyl-19-nor-testosterone-caproate _____ 11
17α-ethinyl-19-nor-testosterone-oenanthate ____ 21
17α-ethinyl-19-nor-testosterone-caprylate _____ 17
17α-ethinyl-19-nor-testosterone-undecylate _____ 17

Photographics of uterus sections in each case made on the tenth day following the injection show, that in the case of the above mentioned compounds, the secretion phase still fully persists while it has already completely disappeared in the case of progesterone.

In order top repare these compounds, either 17-alkyl-19-nor-testosterones may be esterified, or intermediary compounds thereof having an

group in the 17-position and only then converting the esterified intermediate compound into the 17-alkyl-19-nor-testosterone ester.

Although the first named method is not entirely satisfactory, as yet, esterification of the intermediary compounds produces good results. Moreover, this method has the advantage that highly unsaturated compounds are esterified, such as 17-ethinyl compounds, whose 17β-OH group shows only a slight tendency to split off water. Thus, esters of 17-vinyl-19-nor-testosterone can be prepared by esterifying 17-ethinyl-19-nor-testosterone in the desired manner and thereafter converting the ethinyl group by partial hydrogenation into a more saturated group:

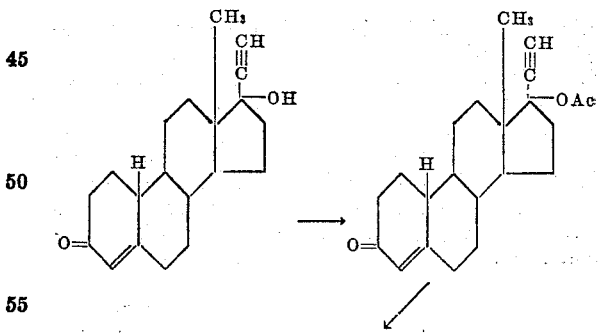

| Application form | 17α-ethinyl-19-nor-testosterone | 17α-ethinyl-19-nor-testosterone-acetate | 17α-ethinyl-19-nor-testosterone-butyrat | 17α-ethinyl-19-nor-testosterone-valerat | 17α-ethinyl-19-nor-testosterone-caproate | Progesterone | Ethinyl-testosterone [1] |
|---|---|---|---|---|---|---|---|
| subcutane mg__ | 0.06 | 0.02 | 0.03 | 0.03 | 0.01 | 0.6 | [1] 2.0 |
| peroral mg____ | 0.10 | 0.03 |  | 0.08 | 0.08 | >60 | [1] 4.0 |

[1] Nach Inhoffen und Hohberg, Naturwissenschaften 6 (1938), 96.

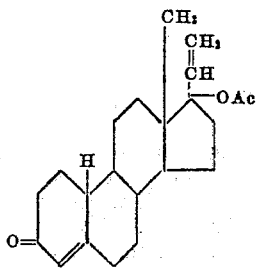

Another suitable steroid compound is the 3-alkyl ether of 17 - ethinyl - Δ$^{2,5(10)}$ - 19 - norandrostadiene-3,17β-diol, which can be prepared according to U.S. Patent No. 2,691,028. This alkyl ether can be directly esterified in the desired manner. The esterified 3-alkyl-enolether is then subjected to an acid saponification, if necessary after previous hydrogenation of the unsaturated group in the 17-position, whereby the Δ$^{5(10)}$-double bond is simultaneously rearranged into a Δ$^{4(5)}$-double bond:

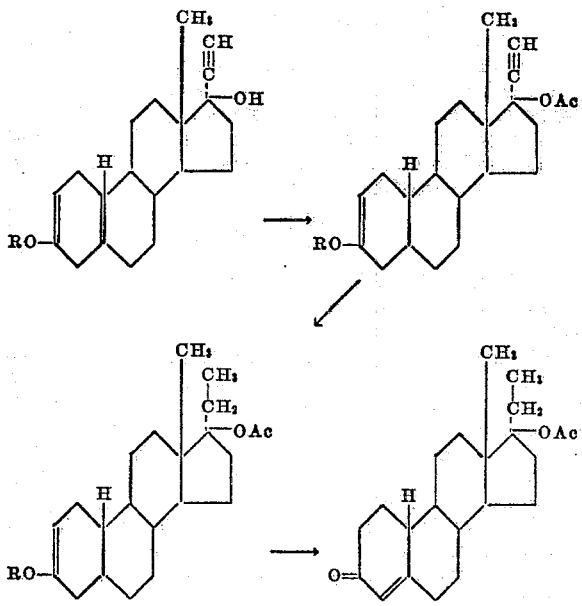

Still another suitable intermediate product is the 3-alkyl ether of 17-alkyl-Δ$^{3,5}$-19-norandrostadiene-3,17β-diol. This compound can be esterified in the desired manner and then, by means of an acid treatment, be converted into the desired 17-alkyl-19-nor-testosterone ester, whereby it is important, however, that sufficiently mild conditions be maintained to split the easily cleavable 3-enolether group but not the 17-ester group and to cause, in addition, a rearrangement of the Δ$^5$- into a Δ$^4$- double bond:

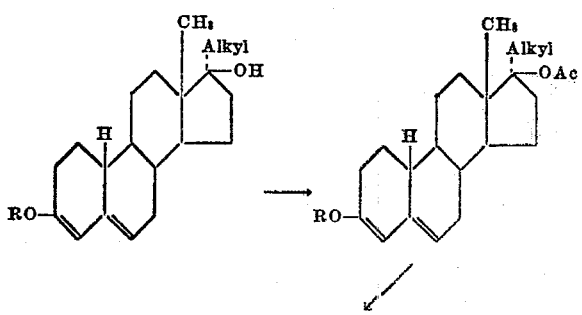

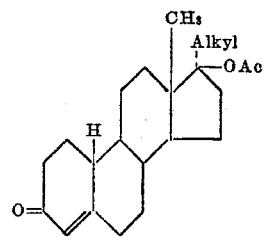

A further useful intermediate for the purpose of this invention is 17α-ethinyl-4-estrene-3,17-diol, which can be prepared according to the Belgian Patent No. 542,273. This compound is first esterified in the desired manner, then partially saponified in order to split off the ester group in the 3-position and, after partial hydrogenation, oxidized into the 17-ethyl-19-nor-testosterone ester by means of an oxidizing agent capable of converting the secondary nuclear hydroxyl group into a keto group:

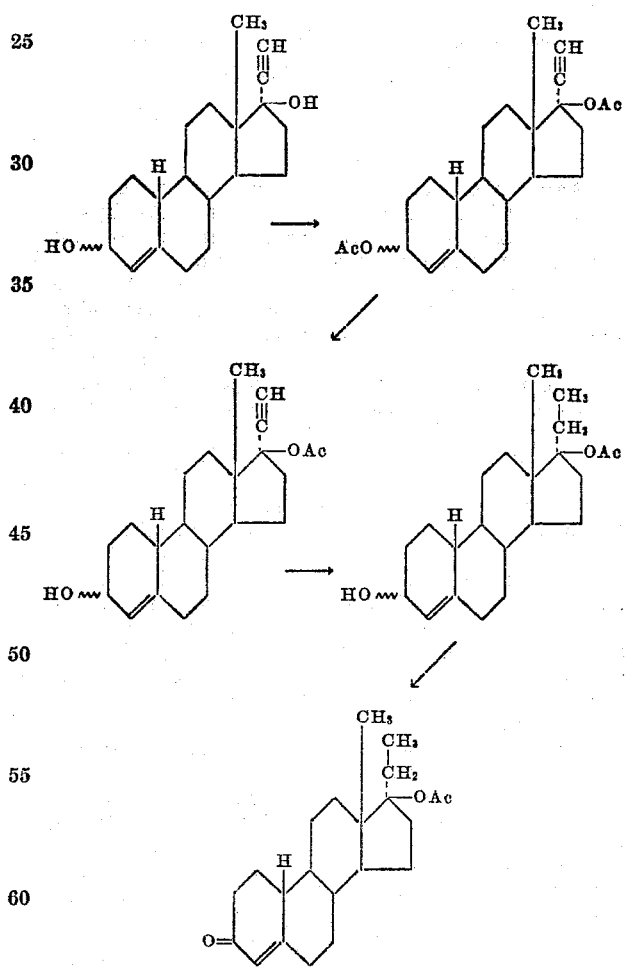

It is noteworthy that, contrary to Δ$^4$-3-ketones, a hydrogenation is attainable in the foregoing case, which converts the ethinyl group as far as to an ethyl group, without a simultaneous hydrogenation of the Δ$^4$-bond.

A similar protection of the Δ$^4$- double band against undesirable hydrogenation can be achieved by means of an intermediary ketalization. Then, if the 17-ethinyl-19-nor-testosterone-3-ketal or the 17-ester thereof is used as intermediate, the corresponding 17-ethyl compounds are readily obtained upon partial hydrogenation. The desired 17-ethyl-19-nor-testosterone esters are produced without difficulties if the ketal is split off in an acid medium:

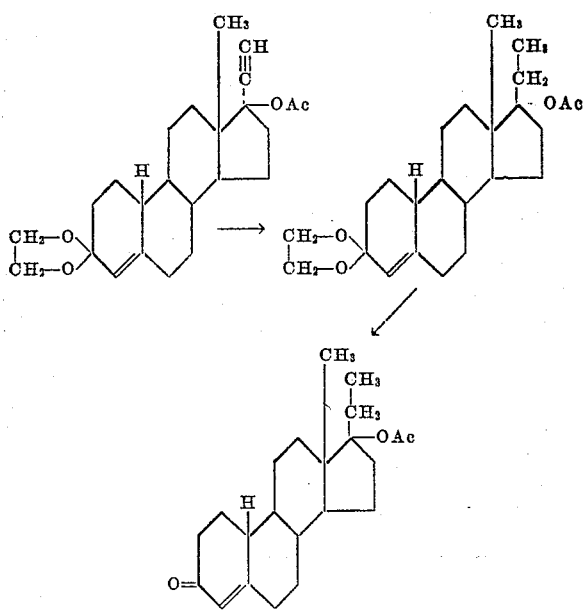

The alkyl group of the herein-described compounds may be a lower aliphatic alkyl comprising up to 8 carbon atoms, such as methyl and ethyl, or an unsaturated group, e.g. a alkenyl or a alkinyl group such as the previously mentioned ethinyl group or the vinyl group.

The carboxylic acid forming the ester may be one of the lower aliphatic or cycloaliphatic carboxylic acids comprising up to 11 carbon atoms. These acids may be employed in form of their anhydrides, acid chlorides or esters. Representative examples of such acids are: acetic-, propionic-, butyric-, valeric, caproic-, isocaproic, heptanoic, caprylic-, capric-, undecylenic-, undecylic, malonic-, malic-, cyclopentyl-proprionic- or cyclohexyl-propionic-acid and the like. These acids may be widely varied. For example, ketocarboxylic acids may be used.

It is, therefore, one of the objects of the present invention to provide a method of preparing esters of 17-alkyl-19-nor-testosterone wherein the alkyl is a lower, saturated aliphatic alkyl or an unsaturated group, such as the ethinyl group and the ester-forming acid group may be any of the lower aliphatic or cycloaliphatic carboxylic acids, including ketocarboxylic acids.

It is another object of the invention to provide aliphatic and cycloaliphatic esters of 17-alkyl-19-nor-testosterone, the ester group of which comprises up to 11 carbon atoms.

It is still another object of the invention to provide such 17-alkyl-19-nor-testosterone esters as therapeutica in human and veterinary medicine.

These and other objects and advantages of the present invention will appear more fully from the hereinfollowing examples and the appended claims.

EXAMPLE 1

*17-methyl-19-nor-testosterone acetate*

2.0 g. of 17-methyl-19-nor-testosterone are heated for 5 hours under reflux in a nitrogen atmosphere with 7 cc. of pyridine and 7 cc. of acetic anhydride. After cooling, the excess of acetic anhydride is carefully decomposed by adding water and the mixture extracted with ether. After washing with 2 N hydrochloric acid, a sodium bicarbonate solution and water, and drying with sodium sulfate, the ether extract is evaporated to dryness in a nitrogen atmosphere. The oily residue is subjected to chromatographic adsorption on 150 g. of aluminum oxide (pH approx. 4) by means of a 1:1 benzene/methylene chloride mixture. The crystalline fractions obtained thereby are recrystallized from hexane; M.P. 91–93.5° C.

EXAMPLE 2

*17-ethinyl-19-nor-testosterone acetate*

(a) 2.98 g. of 17-ethinyl-19-nor-testosterone are suspended in 30 cc. of acetic anhydride and a solution of 1.9 g. of p-toluenesulfonic acid in 19 cc. of acetic anhydride is gradually added while cooling and stirring. Complete dissolution takes place after about one hour. After additional 30 to 60 minutes, a thick, pasty mass separates. The reaction is permitted to continue for a total period of five hours, whereupon water is added to the reaction mixture and the 3-enol-17-diacetate which separates after stirring for one to two hours is filtered off, washed until neutral and dried in vacuo over calcium chloride at room temperature. In order to prepare the mono-acetate, the crude di-acetate is suspended in 150 cc. of methanol and, after adding 1.5 cc. concentrated hydrochloric acid, heated to boiling for 15 minutes in a nitrogen atmosphere. The crude mono-acetate which separates upon the addition of water after cooling is filtered off, washed and dried in vacuo over calcium chloride at room temperature. The pure 17-acetate, obtained after repeated recrystallizations from methylene chloride/hexane has a melting point of 161–162° C.

(b) A mixture of 3 g. of 17α-ethinyl-19-nor-testosterone, 15 cc. of pyridine and 10 cc. of acetic anhydride is heated for ten hours under nitrogen, in an oil bath maintained at 150° C. After cooling to room temperature, water is added while stirring and the crude 3-enol-17β-diacetate, which separates after two to three hours, is filtered off, washed with water and dried in vacuo over calcium chloride. The saponification of the 3-enol-ester group is carried out as described in Example 2(a). The crude 17-acetate is purified by chromatographic separation and recrystallization or by recrystallization alone and has a melting point of 161–162° C.

PHYSICAL DATA

| I.R. spectrum | ester bands | 5.70μ. |
|---|---|---|
| | 3-keto-Δ⁴ bands | 6.00μ and 6.17μ. |
| | OH bands | none. |
| U.V. | ε 240=18.690 | |

The physical data set forth in this and the following examples has been determined by means of a Perkin-Elmer infrared spectrophotometer, model 21 (I.R.), and a Beckmann set, model D.K.1 (U.V.).

EXAMPLE 3

*17-ethinyl-19-nor-testosterone n-butyrate*

(a) A mixture of 3 g. of 17 - ethinyl - 19 - nor - testosterone, 15 cc. pyridine and 10 cc. of butyric anhydride is heated to boiling for ten hours under nitrogen, in an oil bath whose temperature is kept at 170–180° C. After cooling to room temperature, the mixture is stirred into ice water. The 3-enol-17-dibutyrate which separates upon standing for 2–3 hours is taken up with ether and the ether solution washed successively with 2 N sulfuric acid, 5% sodium bicarbonate solution, N/10 sodium hydroxide and water. The solution is then dried over sodium sulfate and evaporated to dryness. The residue crystallizes upon moistening with methanol.

In order to saponify the 3-enolester group, the crude dibutyrate is treated in the same manner as the diacetate in Example 2(a). The 17-butyrate which precipitates upon the addition of water is extracted with ether, and the ether solution washed and dried. After concentrating, hexane is added to the ether solution and the product which thereupon crystallizes in the cold is purified by means of recrystallization from an ether/hexane mixture. The pure mono-butyrate has a melting point of 109–111° C.

(b) 2.98 g. of 17-ethinyl-19-nor-testosterone are reacted with n-butyric anhydride and p-toluenesulfonic acid and treated in the manner set forth in Example 2(a).

The product obtained upon hydrolysis by means of a water-pyridine mixture and ether extraction is treated, as previously described, with a methanol-hydrochloric acid solution and the pure 17-butyrate is separated chromatographically and by means of recrystallization.

By means of a conversion similar to that described at (a), but using longer reaction times, 17-n-valerate, melting point 95–97° C., and 17-caproate, melting point 59–61° C., are obtained, whereby the solution of the 17-caproate obtained after saponification of the 3-enol-caproate group may be subjected to an additional steam distillation.

PHYSICAL DATA

|  | Butyrate | Valerinate | Capronate |
|---|---|---|---|
| I.R. spectrum |  |  |  |
| Ester bands | 5.74μ | 5.73μ | 5.73μ. |
| 3-keto-Δ⁴ bands | 6.05 and 6.21μ | 5.96 and 6.18μ | 5.98 and 6.16μ. |
| OH bands | none | none | none. |
| U.V. | ε 239 = 18.500 | ε 241 = 18.350 | ε 240 = 18.590 |

EXAMPLE 4

17-ethinyl-19-nor-testosterone heptanoate 1.0 g. of 17-ethinyl-19-nor-testosterone is heated to reflux for 17 hours under nitrogen with 5 cc. of pyridine and 5 cc. of freshly distilled heptanoic anhydride at an oil bath temperature of 180° C. The reaction mixture is then subjected to a steam distillation until the odor of heptanoic acid is no longer noticeable. The residue is extracted with ether and the ether extract is washed, first with 2 N sulfuric acid, then with 2 N sodium hydroxide and, finally, with water until neutral reaction. The extract is dried with sodium sulfate, concentrated, and the oily residue triturated with a few drops of methanol to cause crystallization. Standing for 24 hours at −8° C. increases the crystalline yield. Melting point = 82–84° C.

2 g. of this 3-enol-diester are dissolved in 120 cc. of methanol and, after the addition of 1.2 cc. of concentrated hydrochloric acid, boiled to reflux for one-half of one hour. The partly saponified product is subjected to steam distillation until any odor of heptanoic acid ceases. The residue is extracted with ether and the ether extract washed with 2 N sulfuric acid, 2 N sodium hydroxide and finally with water until neutral. The oily residue remaining after drying over sodium sulfate and concentrating is triturated with pentane at low temperature to produce gradual crystallization. After recrystallization from pentane the pure heptanoate melts at 68–71° C.

By means of similar conversions, 17-caproate, melting point 45–46° C., and 17-undecylate, melting point 61–62° C., are obtained. If necessary, the intermediate crude 3-enol-17-diesters may be filtered over Al₂O₃ according to Brockmann in order to remove strongly colored impurities at least to a certain extent, whereby, however, part of the 3-enol ester groups are already saponified at this point.

PHYSICAL DATA

|  | Heptanoate | Caprylate (crude product) | Undecylate (crude product) |
|---|---|---|---|
| I.R. spectrum |  |  |  |
| Ester bands | 5.74μ | 5.74μ | 5.70μ. |
| 3-keto-Δ⁴ bands | 5.98 and 6.17μ | 5.97 and 6.18μ | 6.00 and 6.18μ. |
| OH bands | none | none | none. |
| U.V. | ε 240 = 18.760 | ε 240 = 18.460 | ε 239 = 17.820. |

EXAMPLE 5

17α-ethinyl-19-nor-testosterone acetate

17α-ethinyl-19-nor-testosterone acetate is dissolved in pyridine and, in the presence of Pd on a calcium carbonate carrier, hydrogenated until one mol of hydrogen has been taken up for every mol of the material. After removing the catalyst by filtration, the hydrogenated solution is vacuum concentrated and the residue taken up with ether. The ether solution is washed first with dilute sulfuric acid, dilute sodium bicarbonate solution and water and is then dried over sodium sulfate. After concentrating the ether solution an oil remains which crystallizes after standing for some time. The pure ester obtained after repeated recrystallizations from hexane melts at 98–100° C.

The ester can be also obtained from the free 17-vinyl compound by means of acetylation.

Upon hydrogenating 17α-ethinyl-19-nor-testosterone n-butyrate under similar conditions, the corresponding 17-vinyl compound is obtained. In its crude form it is a viscous oil.

PHYSICAL DATA

|  | Acetate | N-butyrate (crude product) |
|---|---|---|
| I.R. spectrum |  |  |
| Ester bands | 5.74μ | visible. |
| 3-keto-Δ⁴ bands | 5.97 and 6.16μ | visible. |
| OH bands | none | none. |
| U.V. | ε 240 = 18.300 | ε 239 = 17.220. |

The yields according to Examples 2 to 5 are about 70% of the theory, but can be substantially improved by extracting the mother liquors.

We claim:
1. 17α-ethinyl-19-nor-testosterone-acetate.
2. 17a-ethinyl-19-nortestosterone-butyrate.
3. 17α-ethinyl-19-nortestosterone-valerate.
4. 17α-ethinyl-19-nortestosterone-caproate.
5. 17α-ethinyl-19-nortestosterone-heptanoate.
6. 17α-ethinyl-19-nortestosterone-caprylate.
7. 17α-ethinyl-19-nortestosterone-undecylate.
8. Therapeutically valuable carboxylic acid esters of 17-ethinyl-19-nor-testosterone wherein the carboxylic acid is a member of the group consisting of lower aliphatic and cycloaliphatic carboxylic acids containing from 2 to 11 carbon atoms.

References Cited in the file of this patent

UNITED STATES PATENTS

| 2,547,949 | Lawson | Apr. 10, 1951 |
| 2,660,586 | Murray | Nov. 24, 1953 |
| 2,735,854 | Herr | Feb. 21, 1956 |
| 2,774,777 | Djerassi | Dec. 18, 1956 |
| 2,798,879 | Donia | July 9, 1957 |
| 2,813,880 | Campbell | Nov. 19, 1957 |
| 2,838,530 | Colton | June 10, 1958 |
| 2,861,085 | Djerassi | Nov. 18, 1958 |